Feb. 6, 1940. G. D. STEEL 2,189,373
SAFETY CATHEAD
Filed Aug. 5, 1938 2 Sheets-Sheet 1
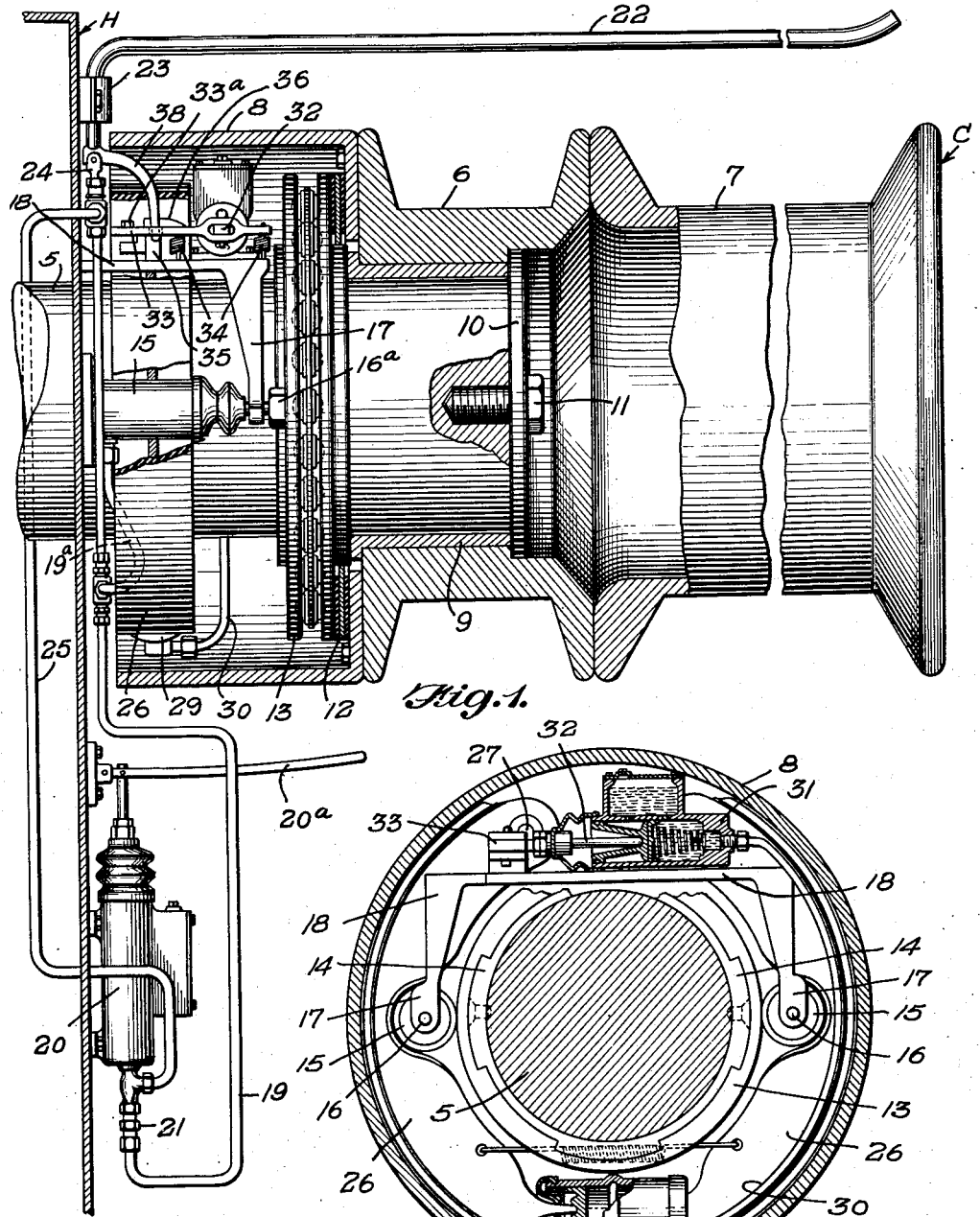

Feb. 6, 1940. G. D. STEEL 2,189,373
SAFETY CATHEAD
Filed Aug. 5, 1938 2 Sheets-Sheet 2
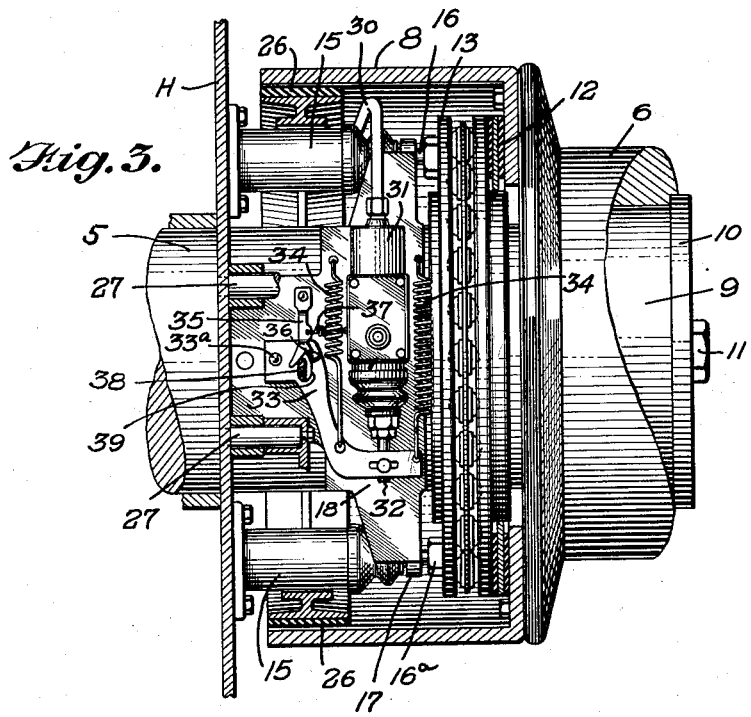
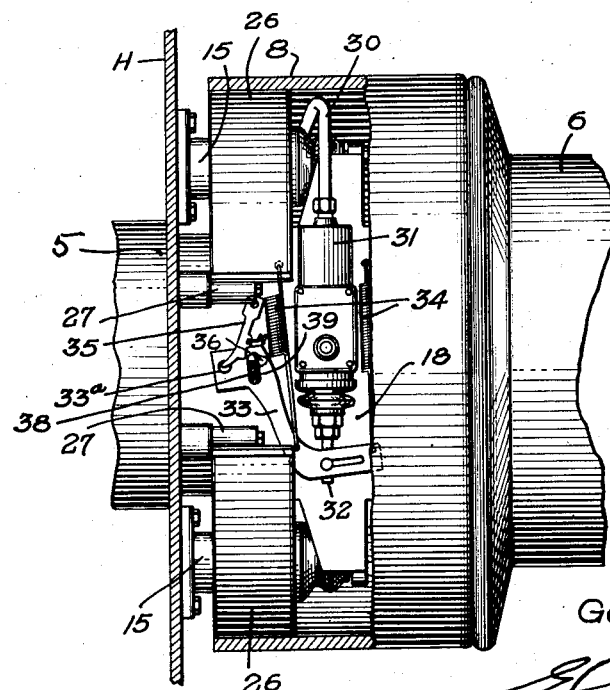
Inventor
George D. Steel Patented Feb. 6, 1940

2,189,373

UNITED STATES PATENT OFFICE 2,189,373

SAFETY CATHEAD

George D. Steel, Casper, Wyo.

Application August 5, 1938, Serial No. 223,319

15 Claims. (Cl. 192—129)

My invention relates to improvements in fluid brake controlled, safety drive transmitting and release mechanism and particularly to a power releasing and stop mechanism adapted particularly for use in transmitting and controlling power from a rotating drive shaft to a cable or rope pulling or driving member such as a windlass, cathead or the like.

The primary object of my invention is, therefore, to provide mechanism in an organization of this type which will operate automatically to release and stop rotation of the driven member quickly and smoothly, as in the case of entanglement of a person or object of equipment in the cable or rigging passing over or around the driven member. More specifically, the invention contemplates an improved type of safety, automatic release and stop mechanism for catheads operating through a guard actuated, fluid controlled co-acting brake and clutch means.

The foregoing and other objects and advantages of my invention will become apparent in view of the following description when taken in conjunction with the accompanying drawings, wherein;

Fig. 1 is a view in section and elevation of a cathead rotatably mounted upon a drive shaft and the safety co-acting fluid-controlled clutch and brake mechanism which is associated therewith.

Fig. 2 is a transverse sectional view with parts broken away and showing the relation of the control operating parts mounted about the drive shaft within the brake drum.

Fig. 3 is a plan view partly in section showing the clutch and brake operating members as they would appear when such parts are positioned for normal running or operation of the cathead with the drive shaft; and Fig. 4 is a view similar to Fig. 3 but showing the brake operating members as they would appear when released to set or apply the brakes and stop relative rotation of the shaft and cathead.

Referring now to the drawings in detail, drive machinery not shown, may be mounted in and protected by a suitable housing designated generally by the vertical wall H, and extending therethrough is a drive shaft 5, having mounted thereon a cathead C, made up of rigidly connected winding drums 6 and 7, and a brake drum 8. As shown, the drum section 6, of the cathead C, is rotatably mounted upon the outer end portion of the shaft 5, by means of a journal bearing sleeve 9, the drum section and its bearing sleeve being retained against endwise movement upon the shaft by means of a thrust plate 10, centrally secured to the end of the shaft by a machine screw 11. In this position of parts the hollow drum section 7, of the cathead, projects outwardly beyond the end of the shaft 5, and the brake drum section 8, extends rearwardly from the winding drum section 6, to surround the inner shaft portion which projects beyond the wall H, of the machine housing.

An annular clutch unit 12, is mounted about the shaft 5, to co-act with the radially flanged portion of the drum 8, which adjoins the inner end of the drum section 6, the clutch including co-acting friction discs and plates 12, and a thrust bearing and thrust bearing plate 13. As shown particularly in Fig. 2, the clutch plate 13, has a positive drive connection with the shaft 5, by means of spline members 14, on which the plate is longitudinally adjustable upon the shaft 5, and for adjusting this clutch plate a pair of hydraulic, clutch operating cylinders 15, are arranged on diametrically opposite sides of the shaft to extend in alignment with the spline members 14. Each of these clutch operating cylinders 15, is rigidly mounted at their rear end upon the wall H, within the confines of the brake drum 8. Slidably mounted within each of these cylinders 15, is a piston from which piston rods 16, extend through the forward ends of the cylinders and through supporting guide bearings in the depending end portions 17, of a main supporting bracket member 18. Beyond the guide bearings in the portions 17, the piston rods 16, are connected to the rear face of the clutch plate 13, and positively secured against movement with respect thereto by means of lock nuts 16a.

A fluid pipe line 19, connects one end of a pump cylinder 20, with each of the clutch operation cylinders 15, by means of branch pipe line sections 19a, said pipe line 19, having therein a positively operated control valve, later to be described, and a back pressure check valve 21, which serve to normally maintain fluid in the pipe line 19 and 19a, and clutch cylinders 15, under sufficient pressure to hold the clutch members 12, in driving relation with the cathead C.

A safety, power or clutch release member in the form of an elongated guard bar 22, which is co-extensive with the cathead, extends outwardly over the brake drum and cathead C, from the housing wall H, and at its rear end is turned downwardly and pivotally mounted in a vertical bearing bracket 23, mounted on the wall H, outwardly of the drum 8. The downwardly turned end portion of this bar 22, extends through and below the bearing bracket and between the rear edge of the brake drum 8, and wall H, to the upper end of the control valve stem 24, with which it is operatively connected. This valve 24, serves to control the pressure of the fluid within the pipe line 19, and cylinders 15, through its connection with the pressure release or return pipe line 25, which latter is also connected to the pump cylinder 20.

As shown the manually operable fluid pump 20, may be mounted at any convenient point such as upon the machine housing wall H, and the fluid pipe lines 19 and 25 may be extended along or through the said wall to points within the confines of the brake drum 8, where they are connected to opposite sides of the safety control valve 24.

Thus it will be seen that when the safety guard bar 22, is deflected and turned in its bearing bracket 23, with the valve stem 24, by impact from any object or article traveling in the space immediately above the drums 6 and 7, of the cathead, that fluid pressure is instantly released in the pipe line 19, and cylinders 15, through the pipe line 25, separating the clutch members 12, and disconnecting the drive between the shaft 5, and cathead C.

To set the elements of the device just described into position for normal operation illustrated in Figs. 1, 2, and 3 the valve member 24, is first closed by moving the safety lever or guard bar 22, to a position above the cathead C, parallel with the axis thereof. The pump handle 20a, of the manually operated pump cylinder 20, is then operated to force fluid through the check valve 21, of the pipe line 19, to build up such actuating and clutch setting pressure within the cylinders 15, as is required, as is above explained.

An expanding brake mechanism, which co-acts with the inner surface of the brake drum 8, is adapted to act simultaneously with the clutch units 12, to stop rotary movement of drum 8, upon deflection of the guard or safety bar 22. This brake mechanism, as best shown in Fig. 2, comprises a pair of brake shoes 26, each having a pivotal mounting at its upper end on bearing pins 27, projecting forwardly from the wall H, as best illustrated in Fig. 3. The opposed lower ends of these shoes 26, are connected, for expansion movement within the drum 8, to oppositely movable plungers or pistons 28, one of which is shown in the broken away section of the hydraulic brake actuating cylinder 29, in Fig. 2. This brake shoe operating cylinder 29, is connected to a fluid pressure line 30, which line is also connected to a master pump cylinder 31, mounted upon the upper side or face of the bracket 18. As shown the brake pump cylinder 31, is provided with a piston and piston rod 32, which rod is pivotally connected at its outer end to one end of an actuating lever 33, and this lever is in turn pivotally mounted at a remote point 33a, on the upper face of the bracket 18.

On each side of the pivotal connection between the piston rod 32, and its actuating lever 33, are connected the ends of a pair of coil springs 34, the opposite ends of the spring being stretched and anchored in openings in the upper face of the bracket 18, on each side of the pump cylinder 31. Thus the outer end portion of the lever 33, is always under the pull or tension of the springs 34, to swing the lever about its pivot 33a, to force the piston rod and its piston 32, toward the bottom or remote end of the pump cylinder 31, as shown in Fig. 4.

In the normal position of these parts, however, such operation of the lever 33, is prevented by means of a latch member 35, which is under control of the deflectable safety guard bar 22. As shown this latch member is also pivotally mounted at one end upon the upper face of the bracket 18, so as to position a toothed outer end portion thereof into the path of movement of a catch 36, which is struck up from the body portion of the pump actuating lever 33. The latch thus operates under the action of a spring 37, to normally hold the lever and the piston rod connected thereto in extended or cocked position under the tension of the lever operating springs 34, as shown in Fig. 3.

For simultaneously operating the latch member 35, with the valve stem 24, an outwardly and downwardly curved lever 38, is formed as a rigid lateral extension of the lower end portion of the guard bar 22, below the bearing bracket 23. This lever 38, as illustrated particularly in Fig. 1, and extends forwardly and downwardly to a point adjacent the outer side of the pivotally mounted latch member 35, and through a slot 39 in the lever 33. It will thus be seen that upon oscillation of the down turned inner end portion of the bar 22, in the bearing bracket 23, that the lever 38, will be swung into engagement with the outer end portion of the latch 35, disengaging the toothed portion thereof from the catch 36, whereafter the springs 34, will swing the lever 33, on its pivot 33a, and force the piston and its rod 32, into the cylinder to compress fluid in the pipe line 30, and brake cylinder 29, to set the brakes.

By reference particularly to Figs. 3 and 4, it will be noted that the brake actuating pump lever 33, is transversely slotted as at 39, the length of the slot being slightly greater than the width of the guard bar extension lever 38, which extends therethrough. The lever 38, can thus move independently for the short distance between the ends of the slot 38, before engaging the latch 35, in one direction and the lever 38, in the opposite direction.

It will be evident from the foregoing that when the safety guard bar 22, is again moved into position parallel with the axis of rotation of the cathead C, to close the valve 24, as above explained, that the master brake pump operating lever 33, and its attached piston, will also be moved on the pivot 33a, to extended position by engagement of the end portion of the guard bar lever 38, with the rear end of the slot 39, in the pump operating lever 38. The spring tensioned latch member 35, is then free to swing in behind the catch 36, and hold these parts in normal retracted or cocked position.

From the foregoing it will be seen that I have devised mechanism which is coordinated to effect instantaneous release of power being transmitted to a rotating member such as a cathead and at the same time effect stopping of the rotating member or cathead without disturbing normal operation of the drive shaft or mechanism associated therewith. Further that such combined operations are expeditiously effected through the use of fluid operated control means in conjunction with a single safety guard bar or lever, requiring the minimum of operating or moving parts. The description and drawings are, therefore, illustrative of a preferred embodiment of my invention, and in this connection wish it understood that changes in structure and design may be made therein by those skilled in the art without departing from the spirit or scope of the invention as defined by the appended claims.

What I claim is:

1. In combination with a rotating shaft having a cathead or analogous device mounted thereon for relative rotation, fluid pressure means providing a driving connection between said shaft and device, a deflectable safety release member extending longitudinally of or and in proximity to said device, a valve for releasing pressure from said fluid pressure means, said member being operatively connected to said valve whereby when the member is deflected the valve is operated to relieve pressure from said driving connecting means.

2. In combination with a rotating shaft having a cathead or analogous device mounted thereon for relative rotation, a clutch arranged to establish a releasable driving connection between the shaft and device, fluid pressure actuated means for operating said clutch, a deflectable safety release member extending longitudinally of and in proximity to said device, a valve for controlling said fluid pressure actuated means, said release member being operatively connected to said valve whereby when the release member is deflected the clutch is released and the shaft is permitted to rotate free in said device.

3. In combination with a rotating drive shaft having a cathead or analogous device mounted thereon for relative rotation, a clutch unit operatively connected to said shaft adjacent said device for establishing a releasable driving connection with said device, a brake operatively associated with said device, hydraulic clutch operating means normally maintaining said clutch in driving relation with said device, hydraulic brake operating means for moving said brake into operative engagement with said device, a source of fluid pressure for said brake and clutch operating means, releasing means including a valve means operatively associated therewith for releasing said clutch operating means, a deflectable, safety release member extending longitudinally of and in proximity to said device, said member having an operative connection with said releasing means whereby when the member is deflected pressure is released from said clutch operating means and pressure applied to said brake means.

4. In combination with a rotating drive shaft having a cathead or analogous device mounted thereon for relative rotation, a clutch connected to said shaft and adapted to exert a drive connection between said shaft and device, hydraulic cylinder and pipe line communicating with the clutch cylinders, a valve in said line normally closing off said pump supply cylinder from said clutch operating cylinders and maintaining pressure in the latter cylinders, a deflectable safety release member extending longitudinally of and in proximity to said device, said release member being operatively connected to said valve whereby when the member is deflected fluid pressure is released from said clutch cylinders and transmitted to said pump supply cylinder.

5. In combination with a rotating drive shaft having a cathead or analogous device mounted thereon for relative rotation, a clutch connected to said shaft and adapted to exert a drive connection between said shaft and device, hydraulic cylinders operatively connected to said clutch, a fluid pressure pump supply cylinder and pipe line communicating with the clutch cylinders, a valve in said line normally closing off said pump supply cylinder from said clutch operating cylinders and maintaining pressure in the latter cylinders, a deflectable safety release member extending longitudinally of and in proximity to said device, said release member being operatively connected to said valve whereby when the member is deflected fluid pressure is released from said clutch operating cylinders and transmitted to said pump supply cylinder, and means for operating to said supply cylinder to force fluid therefrom back to said clutch operating cylinders when said safety release member is returned to its normal position and the valve controlled thereby is closed.

6. In combination with a rotatable drive shaft having a cathead or analogous device mounted thereon and relative rotation, a clutch operatively connected to said shaft for establishing a drive connection between the shaft and device, hydraulic cylinders normally maintaining said clutch in driving engagement with said device, a pump supply cylinder having fluid therein, a pipe line communicating with said supply cylinder and with said clutch operating cylinders and extending from the latter back to said pump supply cylinder, a check valve in said line, a control valve also mounted in said line, a deflectable safety release member extending longitudinally of and in proximity to said device, said member being operatively connected to said control valve whereby when the member is deflected said valve is opened and fluid is permitted to flow from said clutch operating cylinders back through said line to said supply cylinder, and means for forcing the fluid from said supply cylinder back to said clutch operating cylinders when the safety release member is moved to normal position and the control valve is closed.

7. In combination with a rotating drive shaft having a cathead or analogous device mounted thereon for relative rotation, a clutch operatively connecting said shaft and device, fluid cylinders for maintaining said clutch under pressure, a pump supply cylinder having a supply of fluid therein, a hand lever for forcing fluid from said pump supply cylinder to the clutch cylinders, a one-way check valve for preventing return of fluid from the clutch cylinders to said pump supply cylinder, a pipe line connecting said clutch cylinders with said pump supply cylinder between the check valve and said latter cylinder, a valve normally closing said line, a deflectable safety release member extending longitudinally of and in proximity to said device and having an operative connection with said valve whereby when the member is deflected said valve is opened for fluid to pass from the clutch cylinders to said pump supply cylinders.

8. In combination with a rotatable drive shaft having a cathead or analogous device mounted thereon for relative rotation, a clutch operatively associated with said shaft and device, fluid cylinders normally maintaining said clutch under fluid pressure, a brake for stopping said device upon release of said clutch, and hydraulic cylinder for actuating said brake, a safety release member extending longitudinally of and in proximity to said device, and means connecting said member with the clutch cylinders and the brake cylinder whereby when the member is actuated pressure is relieved from the clutch cylinders and pressure applied to the brake cylinder.

9. In combination with a rotatable drive shaft having a cathead or analogous device mounted thereon for relative rotation, a clutch for establishing a drive connection between said shaft and device, a brake adapted to exert a braking action on said device upon release of said clutch, hydraulic clutch operating cylinders normally maintaining said clutch under fluid pressure, a pump supply cylinder communicating with said clutch cylinders and having a one-way valve for preventing return of fluid from said clutch cylinders to said pump supply cylinder, a pipe line communicating said clutch operating cylinders with said pump supply cylinder, between the latter and said check valve, a control valve in said pipe line, a safety release member extending longitudinally of and in proximity to said device, said member having an operative connection with said control valve whereby when the latter is opened by said safety release member fluid passes from said clutch cylinders back to said supply cylinder, a fluid cylinder for actuating said brake, a master pump cylinder for said brake operating cylinder, a plunger in said master cylinder, means normally holding said plunger in extended position, and means also controlled through actuation of said safety release member for moving said plunger inwardly and forcing fluid under pressure into said brake operating cylinder.

10. In combination with a rotating shaft having a cathead or analogous device mounted thereon for relative rotation, clutch means providing a releasable connection between said shaft and device, brake means arranged to stop relative rotation of the shaft and device upon release of said clutch means, and a safety guard member mounted to extend adjacent said cathead and to move relative thereto, said member having an operative connection with each of said clutch and brake means.

11. In combination with a rotating shaft having a cathead or analogous device mounted thereon for relative rotation, clutch means providing a releasable connection between said shaft and device, brake means arranged to stop relative rotation of the shaft and device upon release of said clutch means, a safety guard member mounted to extend adjacent said cathead and to move relative thereto, and means connecting said member with said brake means for setting and releasing the same upon reverse movements of said member.

12. In combination with a rotating shaft having a cathead or analogous device mounted thereon for relative rotation, clutch means providing a releasable connection between said shaft and device, brake means arranged to stop relative rotation of the shaft and device upon release of said clutch means, a safety guard member mounted to extend adjacent said cathead and to move relative thereto, and operating means connecting said member with said clutch and brake means and operable upon movement of said member in one direction to release said clutch means and apply said brake means, said operating means being operable upon reverse movement of said member to effect reengagement of said clutch means and release of said brake means.

13. In combination with a rotating shaft having a cathead or analogous device mounted thereon for relative rotation, fluid pressure means providing a combined driving connection and rotation stopping means between said shaft and device, a deflectable safety guard member mounted for movement adjacent said cathead, and means for controlling said fluid pressure means operatively connected to said member.

14. In combination with a rotating shaft having a cathead or analogous device mounted thereon for relative rotation, fluid pressure means providing a combined driving connection and rotation stopping means between said shaft and device, a deflectable safety guard member mounted for movement adjacent said cathead, and means for controlling said fluid pressure means operatively connected to said member, said last mentioned means including a source of fluid pressure and a stop and a nonstop valve arrangement connected thereto.

15. In combination with a rotating shaft having a cathead or analogous device mounted thereon for relative rotation, fluid pressure means providing a combined driving connection and rotation stopping means between said shaft and device, a deflectable safety guard member mounted for movement adjacent said cathead, and means for controlling said fluid pressure means operatively connected to said member, said last mentioned means including a pump with trip release means for operating the same.

GEORGE D. STEEL.